(12) United States Patent
Obrecht et al.

(10) Patent No.: US 6,809,146 B2
(45) Date of Patent: Oct. 26, 2004

(54) RUBBER MIXTURES CONTAINING SILICA, CARBON BLACK AND RUBBER GEL

(75) Inventors: Werner Obrecht, Moers (DE); Anthony James Morgan Sumner, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 142 days.

(21) Appl. No.: 10/165,159

(22) Filed: Jun. 7, 2002

(65) Prior Publication Data

US 2003/0092827 A1 May 15, 2003

(30) Foreign Application Priority Data

Jun. 15, 2001 (DE) .......................... 101 29 058

(51) Int. Cl.⁷ .............................................. C08L 53/00
(52) U.S. Cl. .................... 524/505; 524/515; 525/333.3; 525/332.2
(58) Field of Search ........................ 525/333.3, 332.2; 524/505, 515

(56) References Cited

U.S. PATENT DOCUMENTS

| | | | | |
|---|---|---|---|---|
| 3,773,732 | A | 11/1973 | Dillenschneider | 260/85.1 |
| 5,124,408 | A | 6/1992 | Engels et al. | 525/215 |
| 5,227,425 | A | 7/1993 | Rauline | 524/493 |
| 5,395,891 | A | 3/1995 | Obrecht et al. | 525/194 |
| 6,127,488 | A | 10/2000 | Obrecht et al. | 525/333.3 |
| 6,133,364 | A | 10/2000 | Obrecht et al. | 524/495 |
| 6,242,534 | B1 | 6/2001 | Obrecht et al. | 525/191 |
| 6,251,976 | B1 | 6/2001 | Scholl et al. | 524/386 |
| 6,399,706 | B1 | 6/2002 | Obrecht et al. | 525/191 |

FOREIGN PATENT DOCUMENTS

| | | |
|---|---|---|
| DE | 19701487 | 7/1998 |
| DE | 19919459 | 11/2000 |
| JP | 56-104906 | 8/1981 |

OTHER PUBLICATIONS

Houben–Weyl Methoden der Organischen Chemie, Thieme Verlag Stuttgart (month unavailable) 1987, vol. 20, pp. 114–134, J. Witte: "Ionisch intiierte Polymerisation von Monomeren mit C,C–Doppelbindungen".

GAK Kautschuk Gummi Kunstsoffe, 38 (month unavailable) 1985, pp. 178–185, The, "Integral Rubber" Concept—an Approach to an Ideal Tire Tread Rubber, K.H. Nordsiek.

Ullmann's Encyclopedia of Industrial Chemistry, VCH Verlagsgesellschaft mbH, D–59451 Weinheim, (month unavailable) 1993, pp. 239–364, Rubber, 3, Synthetic.

Ullmann's Encyclopedia of Industrial Chemistry, vol. 23, (month unavailable) 1993, "Silica" pp. 635–645.

Ullmann's Encyclopedia of Industrial Chemistry, vol. A 5, (month unavailable) 1995, "Carbon" Otto Vohler, Ferdinand von Strum, Erhard Wege, (Chaps 1–3), Hartmut von Kienle, (Chap 4) Manfred Voll, Peter Kleinschmit, (Chap. 5), pp. 95–163.

Ullmann's Encyclopedia of Industrial Chemistry, vol. A 23, Rubber 4, Chemical and Additives, Hans Wilhelm Engels, (Chap. 1), Herrmann–Josef Weindenhaupt (Chaps 2 & 3), Manfred Abele (Chaps 4,5 and 7) Manfred Pieroth (Chap. 6 and 9).

*Primary Examiner*—Peter D. Mulcahy
(74) *Attorney, Agent, or Firm*—Godfried R. Akorli; Diderico van Eyl; Jennifer R. Seng

(57) ABSTRACT

The present invention relates to rubber mixtures based on silica and carbon black-filled solution styrene/butadiene rubbers in which the silica has been partially replaced by rubber gels. The vulcanizates produced from the rubber mixtures of the present invention are distinguished by improved cushioning behavior at 0° C. and 60° C., and this is accompanied by better resistance to slipping when wet and improved rolling resistance. In addition, the vulcanizates have good resistance to wear. The processing behavior of the unvulcanized rubber mixtures (compound viscosity and Mooney relaxation) is not impaired by the partial substitution of silica.

8 Claims, No Drawings

RUBBER MIXTURES CONTAINING SILICA, CARBON BLACK AND RUBBER GEL

FIELD OF THE INVENTION

The present invention relates to rubber mixtures containing carbon black, silica and rubber gels and are based on solution styrene/butadiene rubbers. The rubber mixtures of the present invention, in which a proportion of the silica or of the carbon black has been replaced by a rubber gel, have improved cushioning behavior at 0° C. (resistance to slipping when wet) and improved rolling resistance (improved cushioning behavior at 60° C.), without having other important mechanical properties, such as the resistance to wear of the vulcanizates produced from the rubber mixtures according to the invention, impaired. The processing behavior of the unvulcanized mixtures of the present invention remains virtually unimpaired, as shown by the relevant characteristics (compound viscosity and Mooney relaxation) of the mixtures. The rubber mixtures of the present invention can be used, in particular, to produce tire components of any type and to produce industrial rubber articles.

BACKGROUND OF THE INVENTION

It is known to produce tires or tire components such as tire treads based on silica and carbon black-filled solution styrene/butadiene rubbers (L-SBR), polybutadiene rubbers (BR) and polyisoprene rubbers (IR and NR) with the proportion of the L-SBR greater than the proportion of other known rubbers. The vulcanizates produced from these mixtures are distinguished, in particular, by an advantageous combination of resistance to slipping when wet, rolling resistance and resistance to wear. Disadvantages when using these silica-filled rubber mixtures reside, in particular, in the high costs of specific components required, such as the filler activators and the high specific weight of the silica-filled mixtures associated with processing of the rubber mixtures, which is expensive in terms of energy due to the high viscosity and the high Mooney relaxation.

It is also known to use rubber and microgels as fillers in rubber mixtures. Reference is made, in particular, to EP-A-405 216, U.S. Pat. No. 5,395,891, U.S. Pat. No. 6,127,488 and DE-A 19 701 487. Although the use of an immense variety of rubber gels as fillers in various rubber mixtures is described in the aforementioned patent applications and patents, the aforementioned patent applications and patents do not teach that improved cushioning behavior at 0° C. (resistance to slipping when wet) and improved rolling resistance (improved cushioning behavior at 60° C.) associated with low wear without impairing the processing behavior of the unvulcanized rubber mixtures can be achieved by using small quantities of rubber gels in L-SBR rubber mixtures which contain silica and carbon black.

SUMMARY OF THE INVENTION

The present invention improves the aforementioned properties of rubber mixtures based on L-SBR together with good processing behavior of the unvulcanized rubber mixtures.

The present invention relates to rubber mixtures containing carbon black, silica and rubber gel which exhibit improved cushioning behavior at 0° C. and improved rolling resistance without impairing the processing behavior of the unvulcanized rubber mixtures.

The rubber mixtures of the present invention contains a) solution styrene/butadiene rubber (L-SBR)
b) silica
c) carbon black and
d) rubber gel, wherein component a) is present in the mixture in a quantity of 100 parts by weight, component b) in a quantity of 20 to 120 parts by weight, component c) in a quantity of 5 to 60 parts by weight and component d) in a quantity of 0.1 to 10 parts by weight, providing that the proportion of component c) is 50 wt. % maximum based on the proportion of component b).

DETAILED DESCRIPTION OF THE INVENTION

Preferably, component a) is present in the mixture in a quantity of 100 parts by weight, component b) in a quantity of 30 to 100 parts by weight, component c) in a quantity of 10 to 40 parts by weight and component d) in a quantity of 1.0 to 5.0 parts by weight in the mixture. The proportion of component c) is preferably 5 to 30% based on the proportion of component b) in the mixture.

The rubber mixture of the present invention can additionally contain further known rubbers. The rubber mixture according to the present invention preferably contains polybutadiene rubber (BR) and polyisoprene rubber (IR and NR) both individually and in a combination with one another in addition to the L-SBR rubbers. The proportion of polybutadiene rubber, the proportion of polyisoprene rubber or the proportion of a mixture of polyisoprene rubber and polybutadiene rubber in the mixture is 1 to 50 wt. %, preferably 5 to 40 wt. %, based on the total quantity of L-SBR rubbers present. Also, 5 to 95 wt. % of polybutadiene rubber, based on the total mixture of polybutadiene rubber and polyisoprene rubber, is present when using a mixture of polybutadiene rubber and polyisoprene rubber.

The rubber mixtures of the present invention can also contain filler activators based on organosilicon sulfur compounds (component e)) in quantities of 0.1 to 15 parts by weight, preferably 0.2 to 10 parts by weight.

In addition, the rubber mixtures according to the present invention can also contain the known and conventional rubber auxiliaries and additives as well as crosslinking agents and vulcanization accelerators (component g)) in quantities of 0.05 to 80 parts by weight, preferably 0.1 to 50 parts by weight.

The solution styrene/butadiene rubbers (L-SBR) used in the rubber mixtures of the present invention are produced by a solution process based on vinyl aromatics and conjugate dienes. L-SBR rubbers of this type are known and described in more detail, for example, in the following literature: H. L. Hsieh, R. P. Quirk, Marcel Dekker Inc. New York, Basel 1996; Houben-Weyl, Methoden der Organischen Chemie, Thieme Verlag, Stuttgart, 1987, Vol. E 20, pages 114 to 134; Ullmann's Encyclopedia of Industrial Chemistry, Vol. A 23, Rubber 3. Synthetic, VCH Verlagsgesellschaft mbH, D-69451 Weinheim, 1993, p. 239–364.

Vinyl aromatic monomers suitable for making up the L-SBR rubbers include, for example, styrene, o-, m- and p-methylstyrene industrial methylstyrene mixtures, p-tert.butylstyrene, α-methylstyrene, p-methoxystyrene, vinyinaphthalene, divinylbenzene, trivinylbenzene and divinylnaphthalene. Styrene is preferably used. The amount of vinyl aromatics polymerized into the L-SBR rubbers is in the range of about 5 to 50 wt. % preferably 10 to 40 wt. %.

Conjugated dienes suitable for making up the L-SBR rubbers include, for example: 1,3-butadiene, isoprene, 1,3- pentadiene, 2,3-dimethylbutadiene, 1-phenyl-1,3-butadiene and 1,3-hexadiene. 1,3-butadiene and isoprene, butadienes are preferably used. The content of dienes polymerized into the L-SBR rubbers is in the range of about 50 to 95 wt. %, preferably in the range of 60 to 90 wt. %. The content of vinyl groups in the polymerized dienes is in the range of 10 to 90%, preferably 20 to 80%, the content of 1,4-trans double bonds is the range of about 5 to 80%, preferably 10 to 70% and the content of 1,4-cis double bonds is complementary to the sum of the content of vinyl groups and 1,4-trans double bonds.

In the L-SBR rubbers used in the present invention, the polymerized monomers are usually randomly distributed. It is obviously also possible to use L-SBR rubbers with a block-like structure, which are known as integral rubbers and are described, for example, by K.-H. Nordsiek, K.-H. Kiepert in GAK Kautschuk Gummi Kunststoffe 33 (1980), No. 4, 251–255. L-SBR rubbers having a linear or branched structure or terminal groups modified in a known manner may also be used. Rubbers of this type are described, for example, in FR-A 2 053 786 and in Japanese Patent Application 56-104 906.

The production of the L-SBR rubbers is known and is carried out by anionic solution polymerization using a catalyst based on alkali or alkaline earth metals in an inert organic solvent.

The L-SBR rubbers to be used according to the present invention usually have molecular weights (numerical averages) of 50,000 to 1,000,000 g/mol and glass transition temperatures of −80 to +20° C. (determined by differential thermoanalysis (DSC)).

The rubber mixtures of the present invention may contain polybutadiene rubbers in addition to the L-SBR rubbers. The polybutadiene rubbers to be used usually have a 1,4-cis content of $\geq 85\%$, preferably $\geq 90\%$ and are preferably produced in the presence of Ziegler/Natta catalysts based on transition metals such as titanium, nickel, cobalt and neodymium. Polybutadiene rubbers of this type are described in: Houben-Weyl, Methoden der Organischen Chemie, Thieme Verlag, Stuttgart, 1987, Vol. E 20, pages 114 to 134; Ullmann's Encyclopedia of Industrial Chemistry, Vol. A 23, Rubber 3. Synthetic, VCH Verlagsgesellschaft mbH, D-69451 Weinheim, 1993, p. 239–364.

The polybutadiene rubbers to be used in the present invention have molecular weights (numerical averages) of 50,000 to 1,000,000 g/mol and glass transition temperatures of $\leq -100°$ C.

Polyisoprene rubber may be used as a further rubber component in the rubber mixtures of the invention, the term polyisoprene rubber covers synthetically produced 1,4-cis polyisoprene (IR) as well as natural rubber (NR). The 1,4-cis content in the polyisoprene rubbers is $\geq 80\%$, preferably $\geq 90\%$.

The IR rubbers may be produced in the conventional manner using lithium as well as Ziegler/Natta catalysts (cf. Houben-Weyl, Methoden der Organischen Chemie, Thieme Verlag, Stuttgart, 1987, Vol. E 20, pages 114 to 134; Ullmann's Encyclopedia of Industrial Chemistry, Vol. A 23, Rubber 3. Synthetic, VCH Verlagsgesellschaft mbH, D-69451 Weinheim, 1993, p. 239–364). Natural rubber is preferably used.

The polyisoprene rubbers usually have molecular weights (numerical averages) of 50,000 to 1,000,000 g/mol and a cis-1,4 content >80%, preferably >90%.

Any known silicas which have also been used and employed in rubber mixtures may be used as silicas in the rubber mixtures of the present invention. Silicas of this type are described, for example, in Ullmann's Encyclopedia of Industrial Chemistry, VCH Verlagsgesellschaft mbH, D-69451 Weinheim, 1993, "Silica", p. 635–645. The silicas may be produced pyrogenically or by precipitation from aqueous solutions, precipitated silicas being preferred. The silicas used in the present invention have a specific surface area of about 5 to 1,000 m²/g, preferably of 20 to 400 m²/g. The silicas to used in the invention may optionally also exist as mixed oxides with other metal oxides such as aluminum, magnesium, calcium, barium, zinc, zirconium and titanium oxides. The proportion of metal oxides in the silicas is about 1 to 25 wt. %.

Carbon blacks suitable for the rubber mixtures of the present invention in turn include any carbon blacks known, for example those described in Ullmann's Encyclopedia of Industrial Chemistry, VCH Verlagsgesellschaft mbH, D-69451 Weinheim, 1993, Vol. A 5 "Carbon black", p. 95–158. The carbon blacks to be used can be produced in any known manner by the gas black, furnace black, lamp black and thermal black processes and are denoted by the new ASTM nomenclature (ASTM D 1765 and D 2516) as: N 110, N 115, N 121, N 125, N 212, N 220, N 231, N 234, N 242, N 293, N 299, S 315, N 326, N 330, N 332, N 339, N 343, N 347, N 351, N 375, N472, N 539, N 550, N 582, N 630, N 642, N 650, N 660, N 683, N 754, N 762, N 765, N 772, N 774, N 787, N 907, N 908, N990, N 991. The carbon blacks usually have a BET surface area of about 5 to 200 m²/g, preferably 50 to 150 m²/g.

The term rubber gels, also sometimes as microgels or gels, covers rubber particles which are produced by crosslinking of rubber latices, as described, for example, in U.S. Pat. No. 5,395,891 (BR-gels), U.S. Pat. No. 6,127,488 (SBR-gels) and DE-A 19701487 (NBR-gels). These rubber gels may be produced by corresponding emulsion polymerization, i.e. without a subsequent crosslinking stage. Agglomerated rubber gels (EP-A 1 078 953) may also be used.

The rubber gels used in the present invention may also be modified by incorporation of functional monomers which possess, for example, hydroxyl, carboxyl, vinylpyridine, amino, dialkylamino, chloromethylphenyl and epoxy groups. Rubber gels of this type are described, for example, in DE-A 19 919 459, DE-A-19 834 803 and DE-A-19 834 802.

The rubber gels used in the present invention have particle diameters of about 5 to 1,000 nm, preferably 20 to 600 nm (DVN value to DIN 53206). Due to their crosslinking, they are insoluble and capable of swelling in suitable swelling agents such as toluene. The swelling indices of the rubber gels ($Q_i$) in toluene are 1 to 15, preferably 1 to 10. The swelling index is calculated from the weight of the solvent-containing gel (after centrifugation at 20,000 rpm) and the weight of the dried gel:

$Q_i$=wet weight of the gel/dry weight of the gel.

To determine the swelling index, 250 mg of the gel are allowed to swell for 24 hours in 25 ml toluene while shaking. The gel is then centrifuged off, weighed and then dried at 70° C. to constancy of weight. The dried gel is weighed again. The swelling index is then calculated from the wet weight of the gel and the dry weight of the gel. Rubber gels based on chloroprene rubber, natural rubber, polybutadiene rubber, nitrile rubber and styrene/butadiene rubber are typically used as rubber gels. As already mentioned, the rubber gels may be modified by incorporation of corresponding functional monomers. When modified microgels are used, it is preferable to use those, which contain hydroxyl groups.

A portion of the normally used silica is replaced by the above-mentioned rubber gels in the rubber mixtures of the present invention. The preferred physical properties of the vulcanizates and the improved processability of the vulcanized rubber mixtures are thus obtained. The aforementioned quantities of rubber gels to be used have been calculated in a first approximation in such a way that the degree of filling of the rubber vulcanizates is kept virtually constant in terms of volume. On the basis of this calculation with a conventional silica density of 2 g/cm³ and a rubber gel density of 1 g/cm³, a substitution of 1 to 20 parts by weight of the silica by 0.5 to 10 parts by weight of rubber gel is obtained.

Filler activators, which may be used, include sulfur-containing organosilicon compounds having the following basic structures:

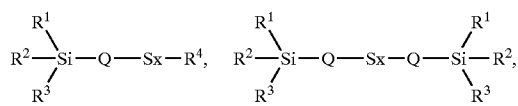

wherein $R^1$, $R^2$ and $R^3$ represent alkoxy groups containing 1 to 10 carbon atoms, Q represents a spacer group based on aliphatic, heteroaliphatic, aromatic or heteroaromatic carbon chains containing 1 to 20 carbon atoms, preferably 1 to 10 carbon atoms and 1 to 3 heteroatoms such as oxygen, sulfur, nitrogen, $R^4$ represents a radical with the following structures:

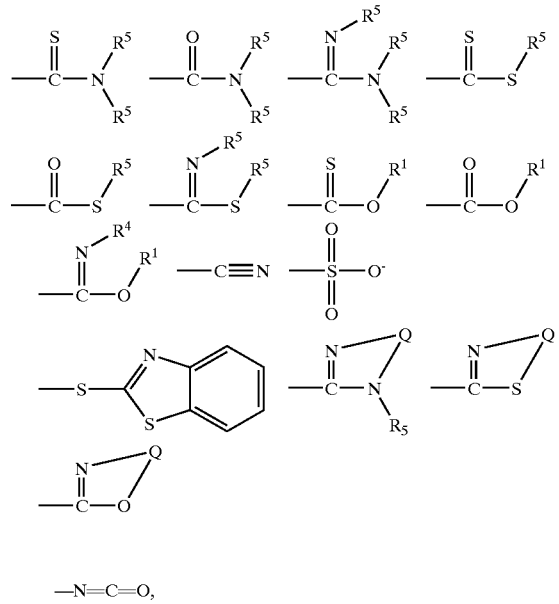

—N=C=O, wherein $R^5$ represents an aliphatic, heteroaliphatic, cycloaliphatic, aromatic or heteroaromatic radical containing 1 to 20, preferably 1 to 10, carbon atoms and 1 to 3 heteroatoms such as oxygen, nitrogen or sulfur.

Preferred sulfur-containing organosilicon compounds include bis(tri-ethoxy-silylpropyl-polysulphanes) of the following structural formula:

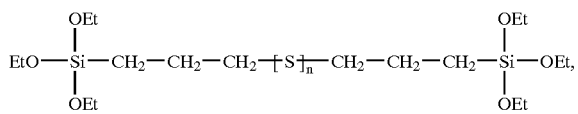

wherein n=2 to 4. Products of this type are commercially available from Degussa under the name Silan Si 75 (n=2) and as Silan Si 69 (n=4).

In addition, the rubber mixtures of the present invention can also contain further rubber auxiliaries and additives, which comprise: antioxidants, anti-reversion agents, light stabilizers, anti-ozonants, processing aids, plasticizers, tackifiers, blowing agents, dyes, pigments, waxes, resins, extenders, organic acids, retarding agents, metal oxides and filler activators such as triethanolamine, polyethylene glycol, hexane triol or other agents known in the rubber industry (Ullmann's Encyclopedia of Industrial Chemistry, VCH Verlagsgesellschaft mbH, D-69451 Weinheim, 1993, Vol. A 23 "Chemicals and Additives", p. 366–417).

The rubber mixtures of the present invention can additionally contain vulcanization accelerators and crosslinking agents such as sulfur or sulfur donors. Examples of suitable vulcanization accelerators include mercaptobenzothiazoles, sulfene amides, guanidines, thiurams, dithiocarbamates, thioureas, thiocarbonates and dithiophosphates (cf. Ullmann's Encyclopedia of Industrial Chemistry, VCH Verlagsgesellschaft mbH, D-69451 Weinheim, 1993, Vol. A 23 "Chemicals and Additives", p. 366–417).

The vulcanization accelerators and crosslinking agents are normally used in quantities of 0.1 to 20 parts by weight, preferably 0.1 to 15 parts by weight, based on the total quantity of rubber, whereas the above-described rubber auxiliaries and additives are used in quantities of 0.5 to 50, preferably 1 to 30 parts by weight, based on the total quantity.

It is obviously possible to mix further components with the rubber mixtures according to the invention such as unmasked and masked, preferably masked bismercaptanes of the following general formulae

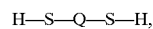

or

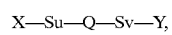

wherein

Q represents a spacer group of the aforementioned type and wherein the hydrogen atoms of the unmasked mercaptanes may be replaced in a suitable manner by the following substituents X and Y:

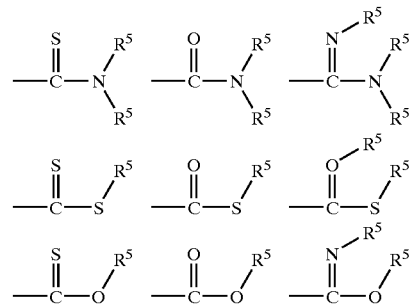

-continued

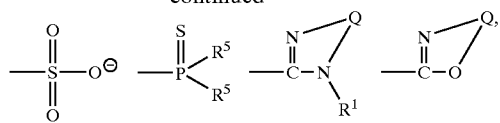

wherein

R⁵ and Q have the meanings described above,
u and v represents numbers from 1 to 6, preferably u=v=2.

The following masked bismercapatanes are of particular interest:

(A)

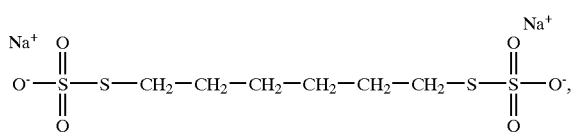

and

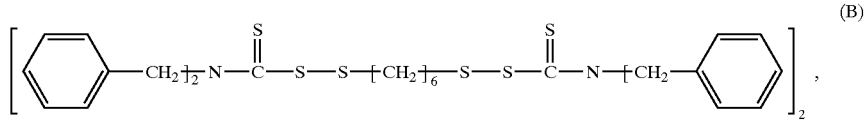

(B)

wherein compound (B) is preferred. Compound (B), 1,6-bis-(N,N'-dibenzylthiocarbamoyldithio)-hexane is commercially available under the name Vulcuren®, VP KA 9188 (Bayer AG).

The aforementioned bismercaptanes may be used in the mixtures of the present invention in parts by weight of 0.1 to 10, preferably 0.2 to 5, based on 100 parts by weight of component (a).

It is also possible to add further fillers in addition to the previously mentioned fillers, silica and carbon black, to the mixtures of the present invention. Examples include:

- synthetic silicates such as aluminum silicate, alkaline-earth silicate such as magnesium silicate or calcium silicate with BET surface areas of 20 to 400 m²/g and primary particle diameters of 5–400 nm,
- natural silicates such as kaolin and other naturally occurring silicas,
- metal oxides such as zinc oxide, calcium oxide, magnesium oxide, aluminum oxide,
- metal carbonates such as calcium carbonate, magnesium carbonate, zinc carbonate,
- metal sulfates such as calcium sulfate, barium sulfate,
- metal hydroxides such as aluminum hydroxide and magnesium hydroxide,
- glass fibers and glass fiber products (laths, strands or glass microspheres),
- thermoplastics (polyamide, polyester, aramide, polycarbonate as well as cellulose and starch).

These fillers may be used in quantities of 1 to 20 wt. %, preferably 1 to 10 wt. %, based on the total quantity of silica and carbon black used.

The rubber mixtures of the present invention are produced by mixing the individual components at temperatures in the range of 130° C. to 180° C., preferably at 145° C. to 180° C., without the addition of agents capable of initiating vulcanization of the mixture. Once the components have been mixed at the elevated temperature, agents capable of initiating vulcanization may be added to the mixture. These include, in particular, crosslinking agents such as sulfur and sulfur-containing compounds as well as vulcanization accelerators of the aforementioned type. The crosslinking agents are mixed in during the second mixing stage at a temperature ≦100° C., preferably at temperatures in the range of 30 to 60° C.

The rubber mixtures of the present invention can be produced using suitable apparatuses such as mixing rollers, internal mixers or mixing extruders.

Vulcanization of the rubber mixtures according to the present invention is usually carried out at temperatures of about 100 to 250° C., preferably 130 to 180° C., optionally under pressure at 10 to 200 bar.

The rubber mixtures produced according to the present invention are used for producing tires and tire components, in particular for producing tire treads, subtreads, carcasses, side walls and apex mixtures and also for producing industrial rubber articles such as cushioning elements, roller coverings, conveyor belt coverings, belts, seals, golf ball cores and shoe soles. The mixtures are preferably used for producing tires and tire components.

EXAMPLES

Production of Rubber Gels to be Used According to the Invention:

The rubber gel (unmodified BR-gel) was produced in the manner described in U.S. Pat. No. 5,395,891 (Example BR-gel A1), 2.5 phr (parts per 100 parts of rubber) dicumylperoxide (DCP) being used for crosslinking. The BR-gel A was stabilized and worked up in a similar manner to gel (2) according to DE-A-19 929 347.

Gel B was produced in a similar manner to gel (3) in DE-A-19 929 347, 1.5 phr dicumylperoxide (DCP) being used instead of 1.0 phr DCP. Gel B was subjected to hydroxyl modification in a similar manner to gel (2) according to the aforementioned DE-A, 1 phr hydroxyethylmethacrylate (HEMA) rather than 3 phr HEMA being used for hydroxyl modification. Stabilization and working up were carried out in the above-described manner.

Characteristic data of the starting latices used and the rubber gels produced appears in Table 1.

TABLE 1

| Product description | Gel type | Styrene content [wt. %] | Quantity of DCP [phr] | Modification Monomer | Quantity [phr] | Diameter $d_{50}$ [nm] | Density [g/cm$^3$] | Gel content [%] | QI | Tg [° C.] |
|---|---|---|---|---|---|---|---|---|---|---|
| Starting latex A | BR | — | — | — | — | 111 | 0.9003 | 92 | 15.8 | −83 |
| Gel A | BR | — | 2.5 | — | — | 110 | 0.9758 | 98 | 3.4 | −35 |
| Starting latex B | SBR | 42 | — | — | — | 53 | 0.9673 | 3.8 | 26 | −32 |
| Gel B | SBR | 42 | 1.5 | — | — | 53 | 0.9958 | 91 | 5.8 | −6.5 |
| Mod. gel B | SBR | 42 | 1.5 | HEMA | 1 | 49 | 1.0031 | 93 | 3.3 | +4.5 |

The following mixtures were produced on the basis of the above-mentioned gels, and the properties of the corresponding vulcanizates were determined.

Mixture Batch A

The following components, as illustrated in Table 2, were mixed in an internal mixer at 160° C. in the specified sequence (quantities stated in parts by weight)

TABLE 2

| | Mixture No.: | | | | | | | |
|---|---|---|---|---|---|---|---|---|
| | 1* | 2 | 3 | 4 | 5 | 6 | 7 | 8 |
| Buna VSL 5025[1] | 103 | 103 | 103 | 103 | 103 | 103 | 103 | 103 |
| Buna CB 24[2] | 25 | 25 | 25 | 25 | 25 | 25 | 25 | 25 |
| Gel A (QBR 1049 B) | 0 | 1 | 3 | 5 | 10 | 20 | 30 | 40 |
| Renopal 450[3] | 12 | 12 | 12 | 12 | 12 | 12 | 12 | 12 |
| Vulkasil ® S[4] | 80 | 78 | 74 | 70 | 60 | 40 | 20 | 0 |
| Silane Si 69 ®[5] | 6.4 | 6.4 | 6.4 | 6.4 | 6.4 | 6.4 | 6.4 | 6.4 |
| Stearic acid | 1 | 1 | 1 | 1 | 1 | 1 | 1 | 1 |
| TMQ[6] | 1 | 1 | 1 | 1 | 1 | 1 | 1 | 1 |
| 6 PPD[7] | 1 | 1 | 1 | 1 | 1 | 1 | 1 | 1 |
| Ozonant wax[8] | 1 | 1 | 1 | 1 | 1 | 1 | 1 | 1 |

*Comparison

The following components, as illustrated in Table 3, of the compound were mixed into the mixture cooled to 50° C. on the roller:

TABLE 3

| | Mixture No.: | | | | | | | |
|---|---|---|---|---|---|---|---|---|
| | 1* | 2 | 3 | 4 | 5 | 6 | 7 | 8 |
| Zinc oxide | 2.5 | 2.5 | 2.5 | 2.5 | 2.5 | 2.5 | 2.5 | 2.5 |
| Sulfur | 1.5 | 1.5 | 1.5 | 1.5 | 1.5 | 1.5 | 1.5 | 1.5 |
| CBS[9] | 1.7 | 1.7 | 1.7 | 1.7 | 1.7 | 1.7 | 1.7 | 1.7 |
| DPG[10] | 2 | 2 | 2 | 2 | 2 | 2 | 2 | 2 |

[1] Oil-extended solution styrene/butadiene rubber from Bayer AG with 37.5 phr petroleum based on 100 phr solid rubber (vinyl content: 50 wt. %; styrene content: 25 wt. %)
[2] Neodymium polybutadiene (oil-free) from Bayer AG
[3] Plasticizer from Fuchs Mineralölwerke
[4] Precipitated active silica from Bayer AG
[5] Bis(tri-ethoxy-silylpropyl) tetrasulfan (Si 69 ® from Degussa AG)
[6] 2,2,4-trimethyl-1,2-dihydroquinoline (polym.) Vulkanox ® HS from Bayer AG
[7] N-1,3-dimethylbutyl-N'-phenyl-p-phenylene-diamine (Vulkanox ® 4020 from Bayer AG TABLE 3-continued

| | Mixture No.: | | | | | | | |
|---|---|---|---|---|---|---|---|---|
| | 1* | 2 | 3 | 4 | 5 | 6 | 7 | 8 |

[8] Mixture of paraffins and microwaxes (Antilux ® 654 from Rhein Chemie)
[9] Cyclohexylbenzthiazylsulpheneamide (Vulkacit ® CZ from Bayer AG)
[10] Diphenylguanidine (Vulkacit ® D from Bayer AG)

The Mooney viscosity ML 1+4 (100° C.) and the Mooney relaxation (MR 30) were used to characterize the properties of the uncrosslinked compound as illustrated in Table 4:

TABLE 4

| | Mixture No.: | | | | | | | |
|---|---|---|---|---|---|---|---|---|
| | 1* | 2 | 3 | 4 | 5 | 6 | 7 | 8 |
| ML 1 + 4 (100° C.) [ME] | 111.3 | 109.7 | 106.7 | 98.3 | 87.5 | 63.0 | 48.6 | 30.4 |
| MR 30 [%] | 24.8 | 25.4 | 24.9 | 22.3 | 20.0 | 13.0 | 9.5 | 4.3 |

The vulcanization behavior of the mixtures was investigated in a rheometer at 160° C. to DIN 53 529 using the Monsanto rheometer MDR 2000E. Characteristic data such as $F_a$, $F_{max}$, $F_{max}-F_a$, $ts_1$, $t_{50}$ and $t_{90}$ were determined in this way and appear in Table 5.

TABLE 5

| | Mixture No.: | | | | | | | |
|---|---|---|---|---|---|---|---|---|
| | 1 | 2 | 3 | 4 | 5 | 6 | 7 | 8 |
| $F_a$ [dNm] | 5.0 | 4.6 | 4.7 | 4.3 | 3.6 | 2.6 | 1.4 | 0.9 |
| $F_{max}$ [dNm] | 25.8 | 25.0 | 23.4 | 22.0 | 19.4 | 15.4 | 10.4 | 7.5 |
| $F_{max}-F_a$ (dNm) | 20.8 | 20.4 | 18.7 | 17.7 | 15.8 | 12.8 | 9.0 | 6.6 |
| $ts_1$ [min.] | 0.6 | 0.4 | 0.9 | 1.1 | 1.4 | 1.8 | 2.2 | 2.4 |
| $t_{50}$ [min.] | 3.7 | 3.9 | 4.0 | 4.0 | 3.7 | 3.2 | 3.1 | 3.5 |
| $t_{90}$ [min.] | 10.7 | 10.4 | 10.1 | 9.7 | 8.7 | 9.4 | 9.5 | 8.0 |

DIN 53,529, part 3 gives the following meanings:
$F_a$: vulcameter display in the minimum of crosslinking isotherms
$F_{max}$: maximum of vulcameter display
$F_{max}-F_a$: difference in vulcameter displays between maximum and minimum
$ts_1$: time when the vulcameter display has increased by 1 Nm relative to the minimum
$t_{50}$: time when 50% of conversion are achieved
$t_{90}$: time when 90% of conversion are achieved The mixtures were vulcanized in the press at 165° C. for 20 minutes.

Table 6 illustrates the test value of the vulcanizates:

TABLE 6

| | Mixture No.: | | | | | | | |
|---|---|---|---|---|---|---|---|---|
| | 1 | 2 | 3 | 4 | 5 | 6 | 7 | 8 |
| Tensile strength [MPa] | 17.6 | 18.4 | 16.1 | 17.0 | 13.7 | 11.5 | 8.9 | 7.0 |
| Elongation at break [%] | 373 | 370 | 355 | 375 | 345 | 380 | 475 | 600 |
| Modulus/50% elongation [MPa] | 1.8 | 1.8 | 1.6 | 1.6 | 1.4 | 0.9 | 0.7 | 0.6 |
| Modulus/100% elongation [MPa] | 3.4 | 3.6 | 3.2 | 3.2 | 2.9 | 2.2 | 1.1 | 1.0 |
| Modulus/300% elongation [MPa] | 13.2 | 13.8 | 12.8 | 12.5 | 11.3 | 8.0 | 4.2 | 2.5 |
| Shore A hardness, 23° C. | 69 | 67 | 65 | 64 | 62 | 57 | 47 | 40 |
| Rebound elasticity 23° C. [%] | 28 | 30 | 31 | 32 | 37 | 44 | 49 | 39 |
| Rebound elasticity 70° C. [%] | 57 | 59 | 61 | 62 | 66 | 67 | 68 | 65 |
| DIN abrasion [mm³] | 90 | 90 | 90 | 95 | 105 | 150 | 220 | 335 |
| tan δ (0° C.) | 0.486 | 0.514 | 0.548 | 0.534 | 0.536 | 0.501 | 0.290 | 0.356 |
| tan δ (23° C.) | 0.240 | 0.226 | 0.213 | 0.203 | 0.171 | 0.146 | 0.130 | 0.192 |
| tan δ (60° C.) | 0.102 | 0.096 | 0.090 | 0.087 | 0.072 | 0.060 | 0.065 | 0.088 |

Result: Mixture batch A shows that by substituting 1, 3 and 5 phr of unmodified BR-gel for 2, 6 and 10 phr of silica respectively, significant advantages may be achieved in the wet slip behavior (tan δ/0° C.) and in the rolling resistance (tan δ/60° C.) without significant losses in processability (compound viscosity) or abrasion resistance.

Mixture Batch B:

The following components, as illustrated in Table 7, were mixed in an internal mixer at 160° C. in the specified sequence (quantities stated in parts by weight)

TABLE 7

| | Mixture No.: | | | | | | | |
|---|---|---|---|---|---|---|---|---|
| | 1* | 2 | 3 | 4 | 5 | 6 | 7 | 8 |
| Buna VSL 5025[1] | 103 | 103 | 103 | 103 | 103 | 103 | 103 | 103 |
| Buna CB 24[2] | 25 | 25 | 25 | 25 | 25 | 25 | 25 | 25 |
| Gel B (OBR 1046 A) | 0 | 1 | 3 | 5 | 10 | 20 | 30 | 40 |
| Renopal 450[3] | 12 | 12 | 12 | 12 | 12 | 12 | 12 | 12 |
| Vulkasil ® S[4] | 80 | 78 | 74 | 70 | 60 | 40 | 20 | 0 |
| Silane Si 69 ®[5] | 6.4 | 6.4 | 6.4 | 6.4 | 6.4 | 6.4 | 6.4 | 6.4 |
| Stearic acid | 1 | 1 | 1 | 1 | 1 | 1 | 1 | 1 |
| TMQ[6] | 1 | 1 | 1 | 1 | 1 | 1 | 1 | 1 |
| 6 PPD[7] | 1 | 1 | 1 | 1 | 1 | 1 | 1 | 1 |
| Ozonant wax[8] | 1 | 1 | 1 | 1 | 1 | 1 | 1 | 1 |

*Comparison

The following components, as illustrated in Table 8, of the compound were mixed into the mixture cooled to 50° C. on the roller:

TABLE 8

| | Mixture No.: | | | | | | | |
|---|---|---|---|---|---|---|---|---|
| | 1* | 2 | 3 | 4 | 5 | 6 | 7 | 8 |
| Zinc oxide | 2.5 | 2.5 | 2.5 | 2.5 | 2.5 | 2.5 | 2.5 | 2.5 |
| Sulfur | 1.5 | 1.5 | 1.5 | 1.5 | 1.5 | 1.5 | 1.5 | 1.5 |
| CBS[9] | 1.7 | 1.7 | 1.7 | 1.7 | 1.7 | 1.7 | 1.7 | 1.7 |
| DPG[10] | 2 | 2 | 2 | 2 | 2 | 2 | 2 | 2 |

[1]Solution styrene/butadiene rubber from Bayer AG with 37.5 phr petroleum (vinyl content: 50 wt. %; styrene content: 25 wt. %)
[2]Neodymium polybutadiene (oil-free) from Bayer AG
[3]Plasticizer from Fuchs Mineralölwerke
[4]Precipitated active silica from Bayer AG
[5]Bis(tri-ethoxy-silylpropyl) tetrasulfan (Si 69 ® from Degussa AG)
[6]2,2,4-trimethyl-1,2-dihydroquinoline (polym.) Vulkanox ® HS from Bayer AG
[7]N-1,3-dimethylbutyl-N'-phenyl-p-phenylene-diamine (Vulkanox ® 4020 from Bayer AG
[8]Mixture of paraffins and microwaxes (Antilux ® 654 from Rhein Chemie)
[9]Cyclohexylbenzthiazylsulpheneamide (Vulkacit ® CZ from Bayer AG)
[10]Diphenylguanidine (Vulkacit ® D from Bayer AG)

The Mooney viscosity ML 1+4 (100° C.) and the Mooney relaxation (MR 30) were used to characterize the properties of the uncrosslinked compound as illustrated in Table 9:

TABLE 9

| | Mixture No.: | | | | | | | |
|---|---|---|---|---|---|---|---|---|
| | 1* | 2 | 3 | 4 | 5 | 6 | 7 | 8 |
| ML 1 + 4 (100° C.) [ME] | 111.3 | 107.5 | 104.8 | 89.0 | 82.7 | 60.4 | 46.7 | 31.7 |
| MR 30 [%] | 24.8 | 24.0 | 24.2 | 24.7 | 18.9 | 12.6 | 9.6 | 4.1 |

The vulcanization behavior of the mixtures was investigated in a rheometer at 160° C. to DIN 53 529 using the Monsanto rheometer MDR 2000E. Characteristic data such as $F_a$, $F_{max}$, $F_{max}-F_a$, $ts_1$, $t_{50}$ and $t_{90}$ were determined in this way and are illustrated in Table 10.

TABLE 10

| | Mixture No.: | | | | | | | |
|---|---|---|---|---|---|---|---|---|
| | 1* | 2 | 3 | 4 | 5 | 6 | 7 | 8 |
| $F_a$ [dNm] | 5.0 | 5.1 | 4.6 | 4.3 | 3.3 | 2.1 | 1.4 | 0.9 |
| $F_{max}$ [dNm] | 25.8 | 24.2 | 22.2 | 20.7 | 17.9 | 14.5 | 9.6 | 6.7 |
| $F_{max}-F_a$ (dNm) | 20.8 | 19.1 | 17.6 | 16.4 | 14.6 | 12.4 | 8.2 | 5.8 |
| $ts_1$ [min.] | 0.6 | 0.9 | 0.9 | 1.3 | 1.5 | 1.9 | 2.2 | 2.3 |
| $t_{50}$ [min.] | 3.7 | 4.1 | 4.0 | 4.1 | 3.8 | 3.3 | 3.0 | 3.1 |
| $t_{90}$ [min.] | 10.7 | 10.5 | 10.1 | 9.0 | 8.0 | 8.7 | 9.2 | 9.1 |

DIN 53 529, part 3 gives the following meanings:
$F_a$: vulcameter display in the minimum of crosslinking isotherms
$F_{max}$: maximum of vulcameter display
$F_{max}-F_a$: difference in vulcameter displays between maximum and the minimum
$ts_1$: time when the vulcameter display has increased by 1 Nm relative to the minimum
$t_{50}$: time when 50% of conversion are achieved
$t_{90}$: time when 90% of conversion are achieved The mixtures were vulcanized in the press at 165° C. for 20 minutes.

The following test values were found on the vulcanizates and appear in Table 11:

TABLE 11

| | Mixture No.: | | | | | | | |
|---|---|---|---|---|---|---|---|---|
| | 1* | 2 | 3 | 4 | 5 | 6 | 7 | 8 |
| Tensile strength [MPa] | 17.6 | 17.7 | 17.5 | 15.3 | 14.2 | 10.1 | 6.6 | 5.1 |
| Elongation at break [%] | 373 | 375 | 380 | 345 | 370 | 370 | 435 | 540 |
| Modulus/50% elongation [MPa] | 1.8 | 1.8 | 1.6 | 1.6 | 1.4 | 1.1 | 0.7 | 0.6 |
| Modulus/100% elongation [MPa] | 3.4 | 3.4 | 3.2 | 3.1 | 2.7 | 2.0 | 1.1 | 0.9 |
| Modulus/300% elongation [MPa] | 13.2 | 13.0 | 12.7 | 12.4 | 10.3 | 7.3 | 3.5 | 2.1 |
| Shore A hardness, 23° C. | 69 | 67 | 66 | 64 | 60 | 55 | 46 | 40 |
| Rebound elasticity 23° C. [%] | 28 | 29 | 29 | 30 | 32 | 33 | 43 | 34 |
| Rebound elasticity 70° C. [%] | 57 | 59 | 60 | 63 | 65 | 69 | 72 | 72 |
| DIN abrasion [mm$^3$] | 90 | 80 | 70 | 80 | 90 | 130 | 225 | — |
| tan δ (0° C.) | 0.486 | 0.488 | 0.511 | 0.514 | 0.526 | 0.480 | 0.312 | 0.358 |
| tan δ (23° C.) | 0.240 | 0.229 | 0.222 | 0.212 | 0.201 | 0.211 | 0.191 | 0.248 |
| tan δ (60° C.) | 0.102 | 0.098 | 0.089 | 0.082 | 0.070 | 0.057 | 0.065 | 0.070 |

Result: Mixture batch B shows that by substituting 1, 3 and 5 phr of unmodified SBR-gel for 2, 6 and 10 phr of silica respectively, significant advantages may be achieved in the wet slip behavior (tan δ/0° C.) and in the rolling resistance (tan δ/60° C.) without significant losses in processability (compound viscosity) and in abrasion resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber mixture comprising
   a) solution styrene/butadiene rubber (L-SBR)
   b) silica
   c) carbon black and
   d) a rubber gel selected from the group consisting of natural rubber, polybutadiene rubber, nitrile rubber and styrene/butadiene rubber,
   wherein component a) is present in the mixture in a quantity of 100 parts by weight, component b) is present in the mixture in a quantity of 20 to 120 parts by weight, component c) is present in the mixture in a quantity of 5 to 60 parts by weight and component d) is present in the mixture in a quantity of 0.1 to 5 parts by weight, and wherein the proportion of component c) is no greater than 50 wt. % based on the proportion of component b).

2. Rubber mixtures according to claim 1 further comprising polybutadiene rubber (BR), polyisoprene rubber (IR and NR) or mixtures thereof, wherein the proportion of the polybutadiene rubber, the proportion of the polyisoprene rubber or the proportion of the mixture of polybutadiene rubber and polyisoprene rubber in the mixture is 1 to 50 wt. %, wherein 5 to 95 wt. % of polybutadiene rubber based on the mixture of polybutadiene rubber and polyisoprene rubber.

3. Rubber mixtures according to claim 1, further comprising a filler activator based on organosilicon sulfur compounds in a quantity of 0.1 to 15 parts by weight.

4. Rubber mixtures according to claim 1, further comprising rubber auxiliaries, additives, cross-linking agents or vulcanization accelerators in a quantity of 0.05 to 80 parts by weight.

5. Process for producing rubber mixtures comprising the steps of mixing (a) solution styrene/butadiene rubber (L-SBR), (b) silica, (c) carbon black and (d) a rubber gel selected from the group consisting of natural rubber, polybutadiene rubber, nitrile rubber and styrene/butadiene rubber, at temperatures in the range of 130 to 180° C., and adding agents that initiate vulcanization of the mixture at a temperature less than 100° C.,
   wherein component a) is present in the mixture in a quantity of 100 parts by weight, component b) is present in the mixture in a quantity of 20 to 120 parts by weight, component c) is present in the mixture in a quantity of 5 to 60 parts by weight and component d) is present in the mixture in a quantity of 0.1 to 5 parts by weight, and wherein the proportion of component c) is no greater than 50 wt. % based on the proportion of component b).

6. Process for producing rubber articles comprising the steps of mixing (a) solution styrene/butadiene rubber (L-SBR), (b) silica, (c) carbon black and (d) rubber gel selected from the group consisting of natural rubber, polybutadiene rubber, nitrile rubber and styrene/butadiene rubber, at temperatures in the range of 130 to 180° C., and adding agents that initiate vulcanization of the mixture at a temperature less than 100° C.,
   wherein component a) is present in the mixture in a quantity of 100 parts by weight, component b) is present in the mixture in a quantity of 20 to 120 parts by weight, component c) is present in the mixture in a quantity of 5 to 60 parts by weight and component d) is present in the mixture in a quantity of 0.1 to 5 parts by weight, and wherein the proportion of component c) is no greater than 50 wt. % based on the proportion of component b).

7. The process according to claim 6 wherein the rubber article is a tire component.

8. A rubber mixture according to claim 1, wherein the rubber gel is modified by a hydroxyl, carboxyl, vinylpyridine, amino, dialkylamino, chloromethylphenyl or epoxy group.

* * * * *